March 8, 1932.  J. PAVLECKA  1,848,745
RESILIENT WHEEL
Filed Oct. 22, 1928   2 Sheets-Sheet 2
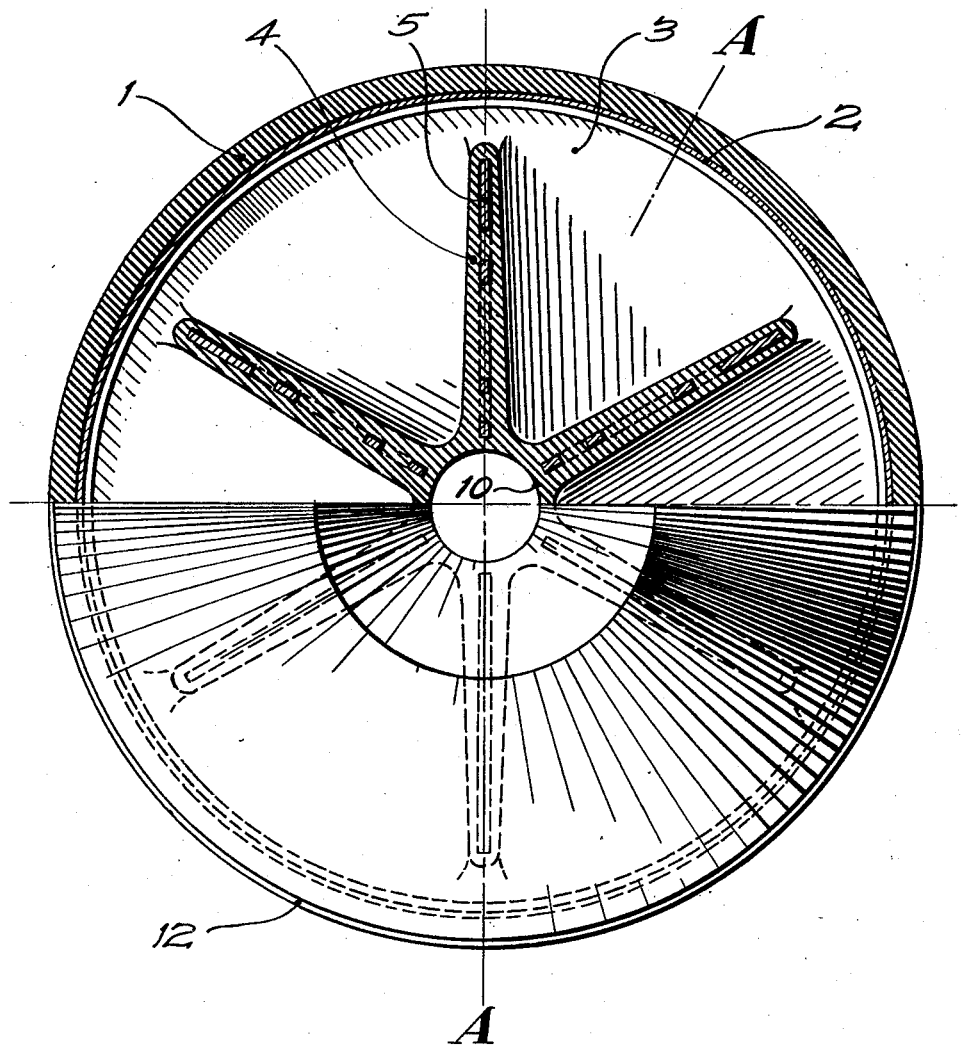
INVENTOR
Jan Pavlecka Patented Mar. 8, 1932

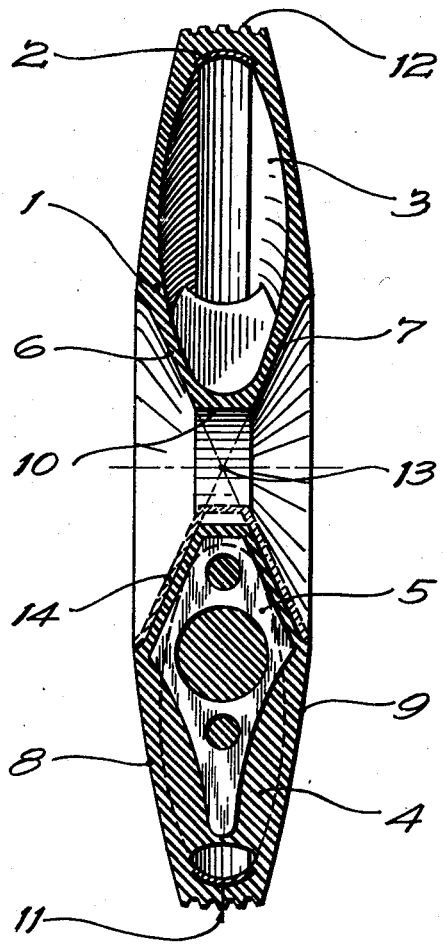

1,848,745

UNITED STATES PATENT OFFICE

JAN PAVLECKA, OF WYANDOTTE, MICHIGAN

RESILIENT WHEEL

Application filed October 22, 1928. Serial No. 314,198.

My invention relates to a novel wheel, intended particularly for airplanes and automobiles, which is built mainly of elastic material and is sufficiently resilient by itself to supplant the customary separate tire and wheel.

A further object is to devise a combination of tire and wheel which does not depend upon pneumatic pressure to hold shape under load and sustain impacts yieldingly, but which maintains its form and bears loads without permanent distortion to itself due to its particular configuration.

Another object of my invention is a resilient wheel suitable especially for aircraft, which performs the functions of a tire, wheel and shock absorber and yet is lighter than the combined weight of these elements, and also less costly because it is simpler structurally and easier to manufacture.

Another object is to provide a wheel for airplanes which possesses an outline form ideally faired against air resistance without the use of special streamlining discs.
An object of no small importance is to devise a wheel for all vehicles which is structurally and functionally reliable and, therefore, safe.

The present invention has been conceived as utilizing a special hub which has been made subject matter of my divisional application Serial No. 314,199, filed October 22, 1928, and which will be referred to hereinfurther as cooperating with the present invention to achieve certain desirable effects.

The wheel of my invention will be described presently in its structure, and at the same time the function of the individual elements thereof will be explained referring to the accompanying drawings which form an essential part of this specification, and wherein Fig. 1 represents a transverse cross-section through the wheel taken longitudinally in the plane of the axis of rotation thereof, and radially in two planes indicated by the line A—A of Fig. 2;

Fig. 2 shows, in the upper half, a section through the wheel in Fig. 1 taken in the plane of symmetry thereof at right angles to the axis of rotation; the lower half is a side view of the wheel with the internal structure indicated by dotted lines.

Like parts are identified by the same reference numerals in both figures.

The wheel, as illustrated, is constituted by the casing 1 molded of elastic material, such as rubber, and of the general form of a biconvex torus characterized by a central aperture 10 for accommodating mounting means, a relatively narrow and substantially cylindrical tread 12 as the rolling surface, and a void or cavity 3 within its walls.

The cross-sectional form of the casing 1 has been conceived after the fashion of a cantilever beam fixed at the axial center and subject to compressive and bending forces acting upon the tread 12 thereof; on the basis of this conception the casing is made to gradually spread in width from its tread toward its central portion, most of the material is distributed along the exterior contour thereof, and other strength imparting features, revealed hereinfurther, are incorporated therein in order to secure the greatest moment of resistance against the said forces with the least mass of material. The resultant profile contour of the casing 1, in addition to possessing structural advantages, approaches, if not attains, an ideally streamlined wheel for low air resistance.

The profile contour of the casing 1 is defined externally by the relatively narrow and substantially cylindrical tread 12 and two sides 8 and 9 flanking said tread obliquely and therefrom proceeding toward the center of the wheel, and in said centripetal progression gradually diverging from the plane of symmetry of the wheel—hereinafter called the median plane—as following along a curve moderately convex with respect to said plane, said curve being a segment of a circle described from a point approximately two diameters of the wheel distant on the axis thereof; considered as a whole, the sides 8 and 9 are, therefore, spherical. As they approach the central portion of the wheel, the sides 8 and 9 are interrupted in their curvilinear progression by an intersection with two cone faces 6 and 7 respectively, one on each side of the wheel symmetrically about the median plane, the theoretical apexes of said cone faces approximately coinciding on a point 13, which is the axial center of the wheel. The cone angle of the faces 6 and 7 can vary within broad limits, the most desirable value being between 90 and 120°. The line of intersection of the sides 8 and 9 with the faces 6 and 7 is a circle, as shown in the lower half of Fig. 2. As a refining detail, a small fillet is shown in Fig. 1 as defining the approach of the faces 6 and 7 to their intersection with the sides 8 and 9. Axially through the casing 1 is a circular aperture 10 which provides room for an axle and a hub.

The object of the cone faces 6 and 7 appears when the aforementioned hub of my invention is taken into consideration, and for this purpose a cross-sectional outline 14 thereof is shown in Fig. 1; the hub comprises essentially two cone plates 14 disposed divergently on and about a central sleeve member. The plates 14 conform in taper and diameter to the faces 6 and 7 on the casing 1 which is positioned between them and radially and laterally supported thereby. Due to constant pressure with which the plates 14 are made to bear against the faces 6 and 7, sufficient static friction ensues to allow of driving and braking torque to be transmitted between the casing 1 and the hub.

The cavity 3 has primarily a lightening purpose and normally need not be inflated for reasons disclosed hereinfurther. The cavity is generated about the axis of the casing 1 by a geometrical curvilinear contour such as circular, oval or elliptical, the major axis of the ellipse coinciding with the median plane of the casing 1. The curvilinear contour of the cavity 3 in combination with the external profile contour of the casing 1, as defined hereinabove, effect a most desirable distribution of the material of said casing by proportioning the mass thereof at any particular point to the stresses at that point, thus making all portions of the casing coact uniformly under strain.

The tread 12 wherein the walls of the casing 1 have their inception, is made relatively heavy to provide for considerable wear; thence the walls retrogress in their respective diverging directions with gradually decreasing thickness as the cavity 3 spreads in width more rapidly than the sides 8 and 9, until a point is reached near the minor axis of the cavity contour about two-thirds of the radius of the casing away from the axis thereof, whereat said walls become the thinnest; but then their thickness assumes again gradually increasing proportions as the cavity 3 decreases in width while the sides 8 and 9 continue to diverge until they intersect with the cone faces 6 and 7, at which point their thickness acquires a maximum; along the faces 6 and 7 the walls are reduced in thickness as the said faces approach tangentially the cavity 3; the amount of material around the aperture 10 depends upon its diameter, but need not be more than the thinnest portion of said walls.

As stated hereinabove, the wheel of my invention is not intended to rely on air pressure to sustain loads and absorb shocks yieldingly, these functions being performed preferably by the elastic material itself due to its ability to yield in compression and distend in tension. This represents a distinct departure from the principle of the customary tire wherein loads are sustained by allowing the casing to be deformed thereby to such an extent as to make the internal air pressure equal the specific loading; while in a tire casing the elastic material has the primary purpose of making the casing deformable and the casing has to be substantially reinforced to withstand the inflation pressure, in the wheel of my invention the elastic material is preferably stressed not by air pressure but directly by the static and dynamic forces acting thereupon, and provides the required resiliency by itself. The ability to deform locally under an external load is, therefore, no longer desired in the wheel in question, and on the contrary, the circular form of the tread 12 is to be maintained under all conditions in order to distribute the strain into the whole mass of material of said casing; for this purpose substantially rigid means is embodied in and around the tread 12 thereof which, in the preferred embodiment, has the form of a metallic hoop 2 disposed circumferentially in the apex of the cavity 3 and transversely shaped to conform to the curvature of said apex. The curved cross-section of the hoop 2 serves the valuable purpose of increasing the stiffness thereof against deflections under local loads. The material and the treatment thereof of the hoop 2 are such as to impart thereto a reasonable degree of elasticity so that it will not fracture easily under impacts.

The structure of the wheel thus far disclosed is devised to effectively sustain forces principally in the direction normal to the tread thereof. A compressive load imposed in such a direction will first be cushioned by the tread 12 and readily transferred to the hoop 2, and through the instrumentality thereof distributed all around the casing 1 and into the walls thereof as a compressive stress on the side of the load and a tension stress on the side opposite thereto across the wheel center. The walls of the casing will resist the compressive stress yieldingly while those under tension will distend to a certain extent with the result that the circular tread of the casing will be displaced eccentrically with respect to the axis of the wheel, but by no means excessively so, as under normal load the intensity of the stress, due to the distribution thereof into the whole casing, is of a relatively small value to distort said casing.

In order to still further reinforce the casing 1, particularly, against the compressive stresses, and moreover, to secure proper stability against side-sway, additional stiffening means is embodied in said casing, and comprises a plurality of partitions 4, Figs. 1 and 2, disposed transversely in equal angular spaces in the cavity 3 substantially radially to the axis of the casing, and molded integrally therewith of the same material. The partitions 4 originate at and about the central aperture 10, and extend radially between the walls of the cavity 3 and finally terminate at a short distance from the apex of said cavity and from the hoop 2 therein; in their radial progression the partitions 4 preferably taper in thickness from their root to their terminal edge and merge into the walls 8 and 9 with liberal fillets all along their contact therewith. In each of the partitions 4 there is solidly imbedded a metallic plate 5 which represents the ultimate rigid means within the casing 1 against the lateral forces.

The plate 5 can be of steel or duralumin sheet, and is shaped to conform, at the base portion thereof, to the external outline of the casing 1 at the aperture 10 and within the cone faces 6 and 7, but is so imbedded in said partition 4 as to leave sufficient elastic material between the edges thereof and said external contour. The portion of the plate 5 beyond the cone faces 6 and 7 tapers in width as it extends outwardly to an apex at the termination of the partition 4, and the edges of this portion follow preferably a slightly concave curvature. In order that the plates 5 be as light as commensurate with their duty only and in order that the partitions 4 be not bisected thereby into two separate halves, and moreover, in order that the bearing surface of said plates on said partitions be increased, a number of perforations are provided in said plates, said perforations being, as for example, circular as shown.

The plates 5 rely in their function on the cooperation of the aforementioned hub in that the cone plates 14 of said hub, paralleling the edges of the plates 5 along the faces 6 and 7, furnish rigid abutments for said plates against lateral deflections, and the plates 5 in turn act as spacers between the plates 14 when the casing 1 is clamped therebetween. The plates 5, being surrounded entirely by the elastic material, allow of a moderate flexibility of the casing in all directions.

It can be readily recognized, that though specalized for forces in two directions at right angles to each other, the hoop 2 and the plates 5 functionally cooperate to a great measure, as do the walls of the casing 1 with the partitions 4 therein between. The hoop 2 transfers lateral forces acting in between the partitions 4 to said partitions and through them to the plates 5, and on the other hand, the partitions 4, reinforced against distortion by the plates 5, assist the walls of the casing 1 to sustain the compressive and the tensile stresses introduced into them by the hoop 2.

The tread 12 of the casing 1 is represented as slightly crowned and provided with a pattern against skidding, in which respect it suggests one of the refinements possible in the structure disclosed hereinabove. Of other refinements and modifications which are at the liberty of those who undertake to adapt this invention to the great variety of practical applications, I want to point out those cases wherein the casing 1 is employed without either the circumferential or the transverse reinforcing means disclosed hereinabove, or where inflation of the said casing is resorted to for certain reasons; these and any other modifications will be considered as falling within the scope of the claims appended hereto.

Having thus disclosed all that is essential and pertinent to the structure of the resilient wheel of my invention, and without confining myself, in the present specification, to any particular method of making the same, what I claim is:—

1. A casing of elastic material, means in said casing for sustaining the loads thereon, said casing having the external form of a bi-convex torus formed by two walls originating at the central portion of said casing and thence proceeding along outwardly converging oblique paths toward a relatively thick tread and making a juncture therewith, said walls being the thickest at said central portion of said casing and the thinnest at a point prior to merging into said tread.

2. A casing of elastic material depending upon inflation for sustaining loads, said casing having the external form of a bi-convex torus with a central mounting means, two sides and a tread, said casing comprising a cavity generated by a curvilinear contour about the axis thereof, said contour being co-ordinated with said external form in a manner whereby the walls of said casing become the thickest at said mounting means and thence assume gradually tapering proportions as they recede outwardly and convergingly toward said tread up to a point distanced therefrom, and thereafter said walls increase in thickness which finally becomes the thickness of said tread.

3. A casing of elastic material, substantially rigid means in said casing for sustaining the loads thereon, said casing having the external form of a bi-convex torus with a central mounting means, two sides and a tread, said casing comprising a cavity generated by a curvilinear contour about the axis thereof, said contour being co-ordinated with said external form of said casing in a manner whereby the walls of said casing acquire non-uniform proportions throughout their bowed and converging paths between said mounting means and said tread, the thickness of said walls being a maximum at said mounting means and a minimum at a point prior to conjoining said tread.

4. A casing of elastic material, means in said casing for sustaining the loads thereon, said casing having the external form of a bi-convex torus with a relatively thick tread, two sides and two cone faces recessing from said sides and sloping to a central aperture, said casing comprising a cavity generated by a curvilinear contour about the axis thereof, said contour being co-ordinated with said tread, sides and cone faces in a manner whereby the walls of said casing will be relatively thin around said central aperture and will acquire rapidly increasing proportions along said cone faces up to the point of their recession from said sides, and thence will taper gradually as they retrogress outwardly and convergingly up to a point distanced from said tread, and thereafter a gradual thickening of said walls will take place until their blending with said tread.

5. A casing of elastic material of substantially the form of a bi-convex torus characterized by a substantially narrow tread, means at and around the axis of said casing for mounting and laterally supporting same, said casing comprising a cavity generated about the axis thereof, a plurality of transverse partitions in said cavity between the walls thereof and integral with said walls, substantially rigid means imbedded in said partitions and cooperating with outside means in bracing said casing laterally, and circular rigid means in and around said tread of said casing for maintaining the circular form thereof under load.

6. A casing of elastic material having the external form of a bi-convex torus with a substantially cylindrical tread, two sides and a central means for mounting said casing on a hub, said casing comprising a cavity generated by a curvilinear contour about the axis thereof, means in said casing for laterally bracing same, and a substantially rigid hoop incorporated in said tread circumferentially around said cavity, said hoop having a cross-sectional profile conforming to that of said cavity thereat whereby said hoop will be self-centering, its stiffness will be materially increased and radial loads will be transferred gradually and uniformly into said sides of said casing.

7. A casing of elastic material, means in said casing for sustaining the loads thereon, said casing having the external form of a bi-convex torus with a tread, two sides and a central mounting means, and comprising a cavity generated by a curvilinear contour about the axis thereof, and a plurality of partitions disposed in said cavity transversely between said mounting means and said sides of said casing, said partitions originating at the central portion of said casing and therefrom extending radially to the proximity of said tread and terminating at a distance therefrom whereby they will be subject mainly to lateral forces introduced into them through said sides to the exclusion of direct radial loads.

8. A casing of elastic material, said casing having the external form of a bi-convex torus with a tread, two sides and a central mounting means, and comprising a cavity generated by a curvilinear contour about the axis thereof, a substantially rigid hoop incorporated in said tread circumferentially around said cavity, a plurality of partitions disposed in said cavity transversely between said mounting means and said sides of said casing, and substantially rigid means co-operating with said partitions and with said mounting means in bracing said casing laterally, said partitions originating at the central portion of said casing and therefrom extending approximately radially toward said tread and terminating at a distance therefrom whereby said hoop in said tread will be free to be displaced eccentrically under load and said partitions will be subject mainly to lateral forces introduced into them through said sides.

9. A casing of elastic material having the external form of a bi-convex torus with a relatively thick tread, two sides substantially spherical and two cone faces recessing from said sides and sloping to a central aperture with the theoretical apexes of said cone faces approximately coinciding on the axial center of said casing; said casing comprising a cavity generated by a curvilinear contour about the axis thereof, a substantially rigid hoop incorporated in said tread circumferentially around said cavity, and a plurality of partitions disposed in said cavity transversely between said cone faces and said sides thereof, said partitions originating at said central aperture and extending outwardly and terminating at a distance from said hoop, and substantially rigid metallic reinforcements in said partitions; said contour of said cavity being co-ordinated with said tread, sides and cone faces in a manner whereby the walls of said casing will acquire non-uniform proportions throughout their bowed and converging paths between said cone faces and said tread, their thickness being a maximum at said cone faces and a minimum prior to conjoining said tread.

10. A casing of elastic material, means in said casing for sustaining the loads thereon, said casing having the external form of a bi-convex torus with a tread, two sides and two cone faces recessing from said sides and sloping to a central aperture, said cone faces providing lateral and radial supporting means of said casing on a hub having corresponding faces; said casing comprising a cavity generated by a curvilinear contour about the axis thereof, a plurality of partitions disposed in said cavity transversely between said cone faces and said sides of said casing, and substantially rigid means incorporated in said partitions and abutting on said hub along said cone faces whereby said rigid means provide spacers between said cone faces when said casing is clamped on said hub and reinforce said casing laterally.

11. A casing of elastic material, means in said casing for sustaining the loads thereon, said casing having the external form of a biconvex torus with a tread, two sides and two cone faces recessing from said sides and sloping to a central aperture, said cone faces providing lateral and radial supporting means of said casing on a hub having corresponding faces; said casing comprising a cavity generated by a curvilinear contour about the axis thereof, a plurality of partitions disposed in said cavity transversely between said cone faces and said sides of said casing, and substantially rigid means imbedded in said partitions for bracing said casing laterally, said bracing means depending in their function upon being held radially and laterally by and between said cone faces of said casing and said hub.

12. A casing of elastic material of the form of a torus with a cavity generated about the axis thereof, a plurality of equidistant transverse partitions disposed radially in said cavity and molded integrally with and gradually merged into the walls thereof, and tapering in thickness as extending from the central portion of said cavity to the periphery thereof, and a metallic plate solidly imbedded in each of said partitions.

13. A casing of elastic material of the form of a torus characterized by a relatively narrow tread, two sides diverging from said tread centripetally, two cone faces sloping to a central aperture, said casing comprising a cavity generated by a curvilinear contour about the axis thereof, a plurality of equidistant transverse partitions disposed radially in said cavity and molded integrally with the walls of said casing, and a metallic perforated plate solidly imbedded in each of said partitions and conforming in contour to the portion of said casing within said cone faces thereon, and thereafter extending outwardly to an apex.

14. A casing of elastic material, means in said casing for sustaining the loads thereon, said casing having the external form of a biconvex torus with a tread, two sides approximately spherical and two cone faces recessing from said sides and sloping to a central aperture, said cone faces providing lateral and radial supporting means of said casing on a hub having corresponding faces; said casing having a cavity generated by a curvilinear contour about the axis thereof, a plurality of partitions in said cavity transversely between said cone faces and said sides of said casing, and substantially rigid perforated plates imbedded in said partitions, said plates having an outline closely paralleling said cone faces and thereafter extending taperingly toward said tread, said plates providing spacers between said cone faces when said casing is clamped on said hub and being in turn dependent upon said cone faces in their function of bracing said casing laterally.

15. A casing of elastic material characterized by a relatively narrow and substantially cylindrical tread, two convex sides approximately spherical, two cone faces recessing from said sides and sloping to a central aperture with their theoretical apexes approximately coinciding on the axial center of said casing, said casing comprising a cavity within said aperture, tread, sides and cone faces, said cavity being generated by a curvilinear contour about the axis thereof, substantially rigid means in said tread around said cavity for maintaining the circular form of said tread under load, a plurality of equidistant transverse partitions disposed radially in said cavity and molded integrally with said casing and terminating at a relatively short distance from the periphery of said cavity, and a perforated metallic plate solidly imbedded in each of said partitions and conforming in contour to the portion of said casing within said cone faces thereon and thereafter extending taperingly to an apex.

16. A casing of elastic material characterized by a relatively narrow and substantially cylindrical tread, two convex sides approximately spherical, two cone faces recessing from said sides and sloping to a central aperture with their theoretical apexes approximately coinciding on the axial center of said casing, said casing comprising a cavity generated, a metallic hoop disposed circumferentially in said cavity and conforming, in cross-section, to the curvature thereof, a plurality of equidistant transverse partitions disposed radially in said cavity and molded integrally with said casing and terminating at a relatively short distance from the periphery of said cavity, and a perforated metallic plate solidly imbedded in each of said partitions and conforming in contour to the portion of said casing within said cone faces thereon and thereafter extending taperingly to an apex at the termination of said partition.

In testimony whereof I affix my signature.

JAN PAVLECKA.